(No Model.)
J. M. SHOLL.
BICYCLE.
No. 583,553.  Patented June 1, 1897.
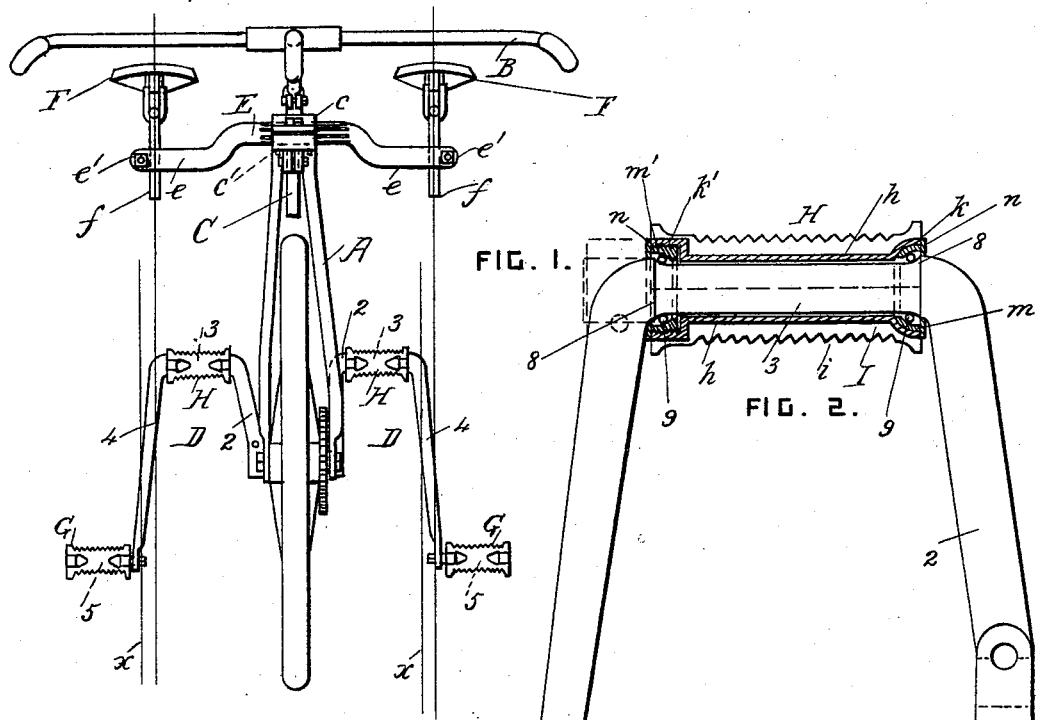
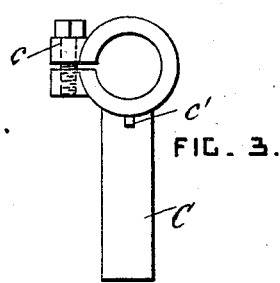
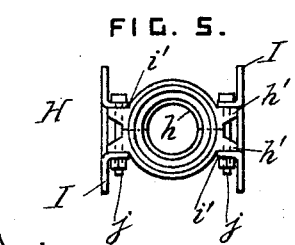
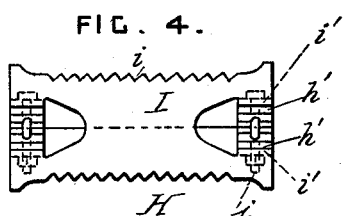
Witnesses
Inventor
Jacob M. Sholl
By Attorney Herbert W. T. Jenner

UNITED STATES PATENT OFFICE.

JACOB M. SHOLL, OF HOBART, INDIANA.

BICYCLE.

SPECIFICATION forming part of Letters Patent No. 583,553, dated June 1, 1897.

Application filed January 23, 1896. Serial No. 576,581. (No model.)

*To all whom it may concern:*

Be it known that I, JACOB M. SHOLL, a citizen of the United States, residing at Hobart, in the county of Lake and State of Indiana, have invented certain new and useful Improvements in Bicycles; and I do hereby declare the following to be a full, clear, and exact description of the invention, such as will enable others skilled in the art to which it appertains to make and use the same.

This invention relates to bicycles; and it consists in the novel construction and combination of the parts hereinafter fully described and claimed, whereby an ordinary safety-bicycle for one person is converted into a bicycle suitable for two persons riding side by side.

In the drawings, Figure 1 is an end view of a bicycle with my improvements attached to it. Fig. 2 is a detail view of one of the double cranks, drawn to a larger scale, and showing one of the removable pedals in action. Fig. 3 is a detail side view of the saddle-bar post. Fig. 4 is a detail side view, and Fig. 5 is an end view, of one of the removable pedals.

A is the frame of a safety-bicycle of any ordinary construction adapted for one person. In order to convert this bicycle into a machine suitable for two persons sitting side by side, the cranks, handle-bar, and saddle-post are removed. A handle-bar B of greater length than ordinary is inserted in place of the original handle-bar, and a saddle-bar post C is inserted in the socket of the ordinary saddle-post. Double cranks D are secured on the ends of the crank-shaft in place of the ordinary cranks.

The post C is provided with a clamp $c$ at its upper end, and preferably has projections $c'$ for engaging with notches in the frame and preventing the post from revolving.

E is the saddle-bar, which is preferably provided with downwardly-cranked ends $e$, having clamps $e'$ at their extremities.

The middle portion of the bar E may have ribs on it, if desired, for engaging with grooves in the clamp and preventing the bar from revolving when the clamp is tightened. The saddle-bar is slidable longitudinally in the clamp and may be adjusted to any desired position before the clamp is tightened.

Two saddles F of approved construction are provided, and their saddle-posts $f$ are secured in the clamps $e'$ of the saddle-bar.

Each double crank D consists of a short arm 2, secured to the axle, a horizontal bearing 3 at the end of the short arm, a long arm 4 at the end of the bearing 3, and a horizontal bearing 5 at the end of the long arm and on the other side of the center of the axle or crank-shaft from the bearing 3. The bearings 3 and 5 of the two double cranks are arranged at the same distance apart laterally, but the bearing 3 of one double crank is arranged at a greater distance from the center line of the frame than the bearing 3 of the other double crank. The left-hand bearing is preferably the more remote from the center line of the frame, and the short arm 2 on the left side is inclined, as shown in Fig. 1. The object in thus arranging the double cranks is to accommodate riders of different weight. When two riders of exactly the same weight ride on a bicycle having its saddles arranged at equal distances from the center line of its frame, as shown in Fig. 1, they are not inconvenienced by their pedals being a little to the left of their theoretically-correct positions, because most of the weight of the riders comes on the saddles, and any overbalancing to the left occasioned by the pressure on the pedals is overcome by a slight lean or inclination to the right on the part of the whole machine and its riders.

When the machine is ridden by two riders of unequal weight, the lighter rider mounts on the left-hand saddle, and before doing so slides the saddle-bar to the left as far as necessary to effect a balance. A short movement of the saddle-bar to the left brings the saddles into their theoretically-correct positions with respect to the pedals, but the saddle-bar may be moved to the left for double that movement, because it is practicable to ride the machine with the saddles as much farther to the left of the center line $x$ between the pedals as they originally were to the right of that line. In this manner an adjustment to the weights of different riders is provided which is sufficient for all practical purposes, and which is accomplished by sliding the saddle-bar without changing the position of the pedals.

The outer pedals G are of any approved construction, and they are journaled on the bearings 5 of the double cranks. The bearings 5 are preferably secured to the arms 4, but they may be formed integral with them, if desired. The arms 4 are preferably formed integral with the bearings 3, but, if desired, they may be secured to them, as indicated by the dotted lines in Fig. 2.

The inner pedals H are provided with two similar half-tubes $h$, having lugs $h'$ at their ends. I are plates provided with notched edges $i$ and inwardly-bent flanges $i'$ near their ends. The flanges $i'$ are slipped over the lugs $h'$, and the lugs and flanges are secured together by bolts $j$, as shown in Fig. 5. The half-tubes have a chamber $k$ at one end and a screw-threaded chamber $k'$ at the other end.

Each bearing 3 has a shoulder 8 at each end, and 9 are antifriction-balls which run against the shoulders.

A bearing-collar $m$ is slipped over the long arm 4 and is secured in the chamber $k$ in contact with one set of balls. A screw-threaded bearing-collar $m'$ is slipped over the long arm 4 and is screwed into the chamber $k'$ over the other set of balls. The adjustment of the bearing-collars is effected by turning the bearing-collar $m'$ in its chamber. Guard-plates $n$ are secured over the ends of the chambers to keep out the dust.

The attachments hereinbefore described may be duplicated and applied to a tandem bicycle of approved construction, thereby enabling four persons to ride together, two upon each side of the machine.

What I claim is—

1. The combination, with a bicycle driving-gear and frame provided with two saddles arranged side by side, of two double cranks secured to the ends of the crank-shaft under the respective saddles, each double crank comprising a short arm secured to the crank-shaft, an inner pedal-bearing at the end of the short arm, a long arm at the end of the said bearing, and an outer pedal-bearing at the end of the long arm, substantially as set forth.

2. A removable pedal for a bicycle-crank, comprising two half-tubes having projecting lugs near their ends, plates having inwardly-bent flanges near their ends for slipping over the said lugs, and bolts passing through the said flanges and lugs, substantially as described and shown.

3. The combination, with the driving-gear and frame of a bicycle, of two laterally-adjustable saddles arranged side by side, and two double cranks secured to the ends of the crank-shaft under the respective saddles, each said double crank comprising a short arm secured to the crank-shaft, an inner pedal-bearing at the end of the short arm, a long arm at the end of the said bearing, and an outer pedal-bearing at the end of the long arm, the two pedal-bearings of one double crank being arranged at a greater distance from the center line of the frame than the two pedal-bearings of the other double crank, substantially as set forth.

In testimony whereof I affix my signature in presence of two witnesses.

JACOB M. SHOLL.

Witnesses:
A. D. BUCHANAN,
R. C. MACKEY.